US009829950B2

(12) United States Patent
Bozek et al.

(10) Patent No.: US 9,829,950 B2
(45) Date of Patent: Nov. 28, 2017

(54) POWER MANAGEMENT IN A VIRTUAL MACHINE FARM AT THE LOCAL VIRTUAL MACHINE PLATFORM LEVEL BY A PLATFORM HYPERVISOR EXTENDED WITH FARM MANAGEMENT SERVER FUNCTIONS

(75) Inventors: James J Bozek, Bothell, WA (US); Kellie Francis, Research Triangle Park, NC (US); Edward Stanley Suffern, Chapel Hill, NC (US); James Lee Wooldridge, Fall City, WA (US)

(73) Assignee: Lenovo Enterprise Solutions (Singapore) PTE., LTD., New Tech Park (SG)

( * ) Notice: Subject to any disclaimer, the term of this patent is extended or adjusted under 35 U.S.C. 154(b) by 908 days.

(21) Appl. No.: 12/471,825

(22) Filed: May 26, 2009

(65) Prior Publication Data

US 2010/0306560 A1 Dec. 2, 2010

(51) Int. Cl.
*G06F 1/32* (2006.01)

(52) U.S. Cl.
CPC .................... *G06F 1/3203* (2013.01)

(58) Field of Classification Search
CPC ...................................................... G06F 1/3203
USPC ........................................................ 713/320
See application file for complete search history.

(56) References Cited

U.S. PATENT DOCUMENTS

| 5,845,138 A * | 12/1998 | Nowlin, Jr. ......... G06F 9/30083 713/323 |
| 6,715,088 B1 * | 3/2004 | Togawa .......................... 713/320 |
| 7,356,665 B2 * | 4/2008 | Rawson, III ................... 711/202 |
| 7,543,166 B2 * | 6/2009 | Zimmer et al. ................ 713/310 |
| 7,725,505 B2 * | 5/2010 | Bonev et al. ................... 707/814 |
| 7,904,739 B2 * | 3/2011 | Larson ........................... 713/323 |
| 8,191,062 B2 * | 5/2012 | Grobman .............. G06F 9/5077 713/300 |
| 2002/0083110 A1 * | 6/2002 | Kozuch ................. G06F 1/3203 718/1 |
| 2002/0099753 A1 * | 7/2002 | Hardin .................. G06F 1/3203 718/1 |
| 2004/0111596 A1 | 6/2004 | Rawson, III |

(Continued)

FOREIGN PATENT DOCUMENTS

| CN | 101231552 | 7/2008 |
| JP | 2000-259292 A | 9/2000 |

(Continued)

OTHER PUBLICATIONS

Virtual Power: Coordinated Power Management in Virtualized Enterprise Systems R. Nathuji et al. symposium on operating systems, stevenson Washington Oct. 14-17, 2007.

(Continued)

*Primary Examiner* — Nitin Patel
*Assistant Examiner* — Eric Chang
(74) *Attorney, Agent, or Firm* — Jason Friday

(57) ABSTRACT

Power management for a virtual machine farm in which each hypervisor respectively serving each virtual machine platform in the farm is provided with an extended hypervisor function coacts with functions provided by the connection broker and the manual configuration interface of the virtual machine farm management server for managing each respective virtual machine platform to maximize the time that each platform is in the reduced power state.

15 Claims, 4 Drawing Sheets

(56) References Cited

U.S. PATENT DOCUMENTS

| | | | |
|---|---|---|---|
| 2005/0060590 A1 | 3/2005 | Bradley et al. | |
| 2005/0268078 A1 | 12/2005 | Zimmer et al. | |
| 2007/0073896 A1 | 3/2007 | Rothman et al. | |
| 2007/0150893 A1* | 6/2007 | Grobman | G06F 1/3203 718/1 |
| 2007/0198656 A1 | 8/2007 | Mazzaferri et al. | |
| 2007/0234077 A1 | 10/2007 | Rothman et al. | |
| 2008/0177424 A1 | 7/2008 | Wheeler et al. | |
| 2008/0301473 A1 | 12/2008 | Perez et al. | |

FOREIGN PATENT DOCUMENTS

| | | |
|---|---|---|
| JP | 2006113767 | 4/2006 |
| JP | 2007188139 | 7/2007 |
| JP | 2007536657 | 12/2007 |
| JP | 2008-269249 A | 11/2008 |

OTHER PUBLICATIONS

D. Turk, "Virtual Linux servers under z/VM: security, performance, and administrative issues", IBM Systems Journal, Jul. 2005.

Jim Fall, "More Power to Ya, Expanded Virtualization Manager capabilities help customers grow and manage uirtualized environments", IBM Systems Magazine, Sep. 2007.

* cited by examiner

POWER MANAGEMENT IN A VIRTUAL MACHINE FARM AT THE LOCAL VIRTUAL MACHINE PLATFORM LEVEL BY A PLATFORM HYPERVISOR EXTENDED WITH FARM MANAGEMENT SERVER FUNCTIONS

CROSS-REFERENCE TO COPENDING PATENT APPLICATION

Copending application Ser. No. 12/393,475, James J. Bozek et al., filed Feb. 26, 2009, entitled: Power Management to Maximize Reduced Power State For Virtual Machine Platforms, assigned to common assignee, is hereby incorporated by reference.

TECHNICAL FIELD

The present invention relates to power management virtual machine platforms including a plurality of virtual machines, each respectively connected to each of a plurality of separate computers and computer devices, and particularly to power management for farms; such virtual machine platforms controlled through virtual machine farm management servers.

BACKGROUND OF RELATED ART

In the past ten years, with the great increase in World Wide Web (Web) systems, the computer processing power required by an organization has grown exponentially each year so that now hundreds, and even thousands, of servers are required. This has led to a resurgence of larger and larger mainframe computers; particularly mainframe and like large computers operating in a virtual machine (VM) mode in which multiple instances of an operating system and associated application program reside on the same physical hardware.

Such virtual machines have been satisfying the needs for the large number of operating instances and applications that are often arrayed as virtual machine server farms in which the virtual machines reside on a number of physical servers. For further background, attention is directed to the article: Virtual Linux servers under z/VM: security, performance, and administrative issues, D. Turk, published in the IBM Systems Journal, July 2005; and to the article, More POWER to Ya, Expanded Virtualization Manager capabilities help customers grow and manage virtualized environments, Jim Fall, published in the IBM Systems Magazine, September 2007. In such virtual machine environments, wherein multiple user computers are connected to each physical virtual machine platform providing a plurality of virtual machines respectively connected to these multiple users at client computers and computer controlled devices, power management is difficult to control. Full power is required at each virtual machine platform prior to the initiation of a virtual machine session. Since the virtual machine platform must always be available to remote user computers that need to access appropriate virtual machines, it has been customary to continuously operate any on-line platform in a full power mode. The wasted power consumption becomes particularly pronounced when the virtual machine platforms are arrayed as virtual machine server farms consisting of a number of physically powered servers.

SUMMARY OF THE PRESENT INVENTION

The present invention addresses the power consumption problem of maintaining each virtual machine platform in a farm of such virtual machine platforms, in a full power mode even when there are no user computers connected to the virtual machine platform in an active mode.

To this end, the present invention provides a system, method and computer program for power management in which each hypervisor respectively serving each physical virtual machine platform in the farm is provided with an extended hypervisor function that coacts with functions provided from the overall virtual machine farm management servers for managing each respective virtual machine platform to maximize the time that each platform is in the reduced power state.

There is provided a plurality of sets of client devices so that each set includes a plurality of client devices respectively connected to the virtual machines in one of said plurality of virtual machine platforms. Client devices are understood to include user computers and computer subsystems including printers, disk drives and serial ports among others. In the description of the invention that follows, when the term user computer is used, it is intended to include all such client devices.

A virtual machine farm management server for distributing and coordinating workload among the virtual machine platforms is provided. There are means in the management server, operatively associated with each of the platform hypervisors to provide an extended platform hypervisor, in which the extended hypervisor includes: means for determining if each of the client devices connected to the virtual machines controlled by the extended platform hypervisor is in an active state; and means for switching the virtual machine platform of the extended platform hypervisor into a reduced power consumption state when all of the client devices connected to virtual machines controlled by the extended platform hypervisor are in a non-active state.

In order to provide the extended hypervisor function of the present invention, the farm management server provides the extended hypervisor with means, a manual configuration interface, for inputting data to configure the extended platform hypervisor to monitor and place the virtual machine platform of the extended hypervisor into the reduced power consumption state upon a predetermined period after all of the client devices connected to virtual machines controlled by the extended platform hypervisor are in a non-active state.

The virtual machine farm management server also provides the extended hypervisor with functions, in a management server connection broker, for tracking said reduced power consumption state of the virtual machine platform of the extended hypervisor.

The virtual machine farm management server further provides the extended hypervisor with functions for switching the virtual machine platforms controlled by each of said extended platform hypervisors back to full power state upon the activation of a client device connected to a virtual machine controlled by said extended platform hypervisor.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
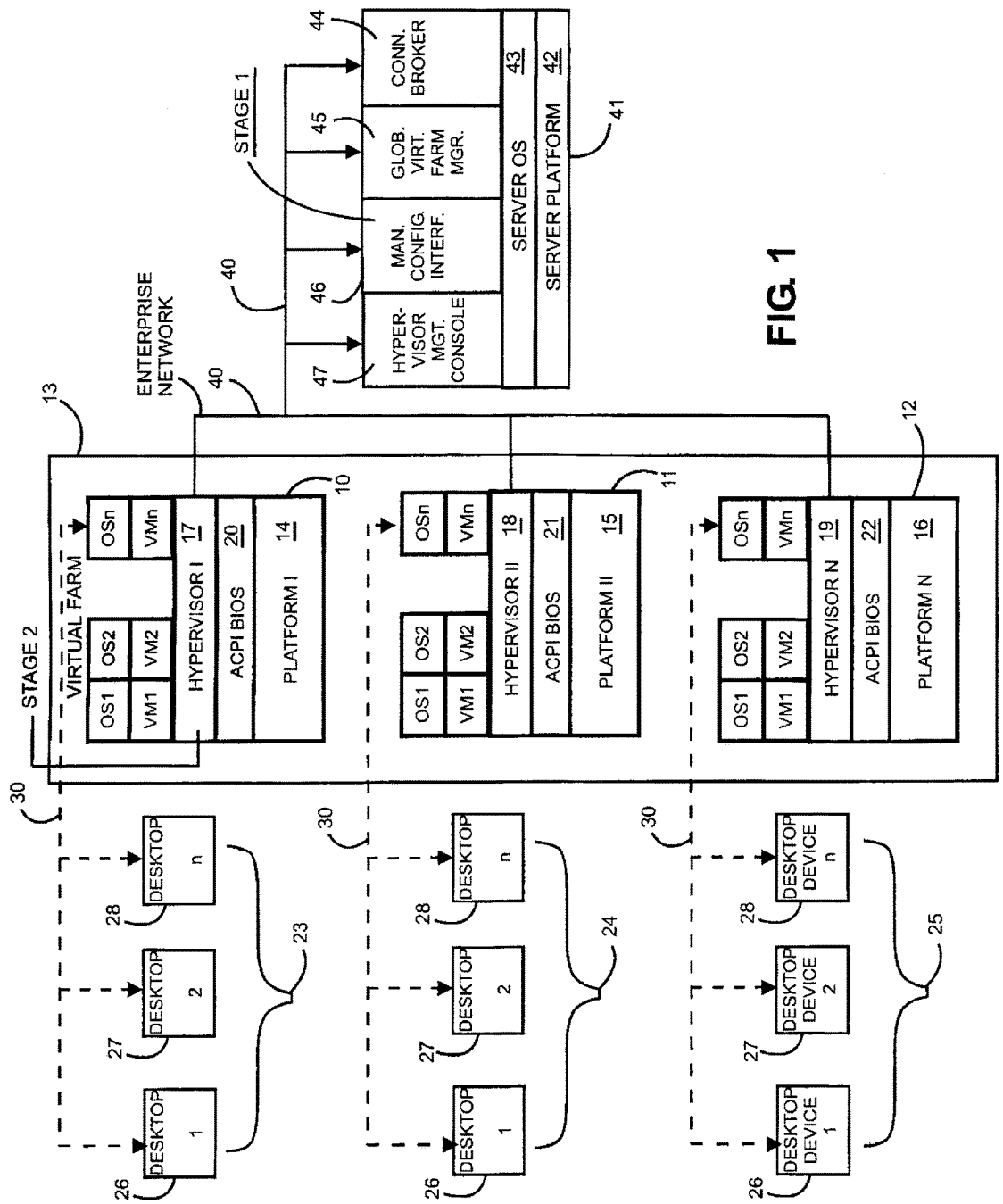
FIG. 1 is a generalized diagrammatic view of a network portion showing a farm of a plurality of virtual machine platforms respectively connected to a plurality of sets of user computers or computer controlled devices managed by virtual machine farm management servers.

Referring to FIG. 1, there is shown, a network including a virtual farm of a plurality of virtual machine units 10, 11 and 12, as shown within boundary 13. Each unit includes a virtual machine platform (I-N) 14, 15 and 16, and a respective hypervisor I-N, 17 through 19 that will function as the extended hypervisor, as will hereinafter be described. Each unit has a standard ACPI (Advanced Configuration Power Interface) BIOS 20 through 22.

Each virtual machine unit that is defined by its respective platform (I-N), 14, 15 and 16, controls a respective set, 23 through 25, of user computers, i.e. client devices, Desktops 1, 2 and n (26 through 28) (which may be remote), connected via network connectors 30 that may be over the Web to virtual machines, each of VM1, VM2 and VMn in the respective platforms 14 through 16, using each of operating systems OS1, OS2 and OSn in each unit platform 14 through 16.

The virtual machine farm 13 is controlled via a virtual farm management server 41 in an enterprise network 40. This farm management function may be implemented by servers of the x86 type. For example, the IBM BladeCenter™ HS22 blade server may be used for this implementation configured with IBM Systems Director 6.1.

The management server 41 is illustrated in general as supported on a server platform 42 with an appropriate operating system 43 operating the following function units, among others: a connection broker 44; a Global Virtual Farm Manager 45 is available to supervise the running of virtual machine platforms where a plurality of virtual machine farms are being controlled; a hypervisor management console 47 provides the hypervisor function for the management server; and a manual configuration interface 46.

Figure 2:
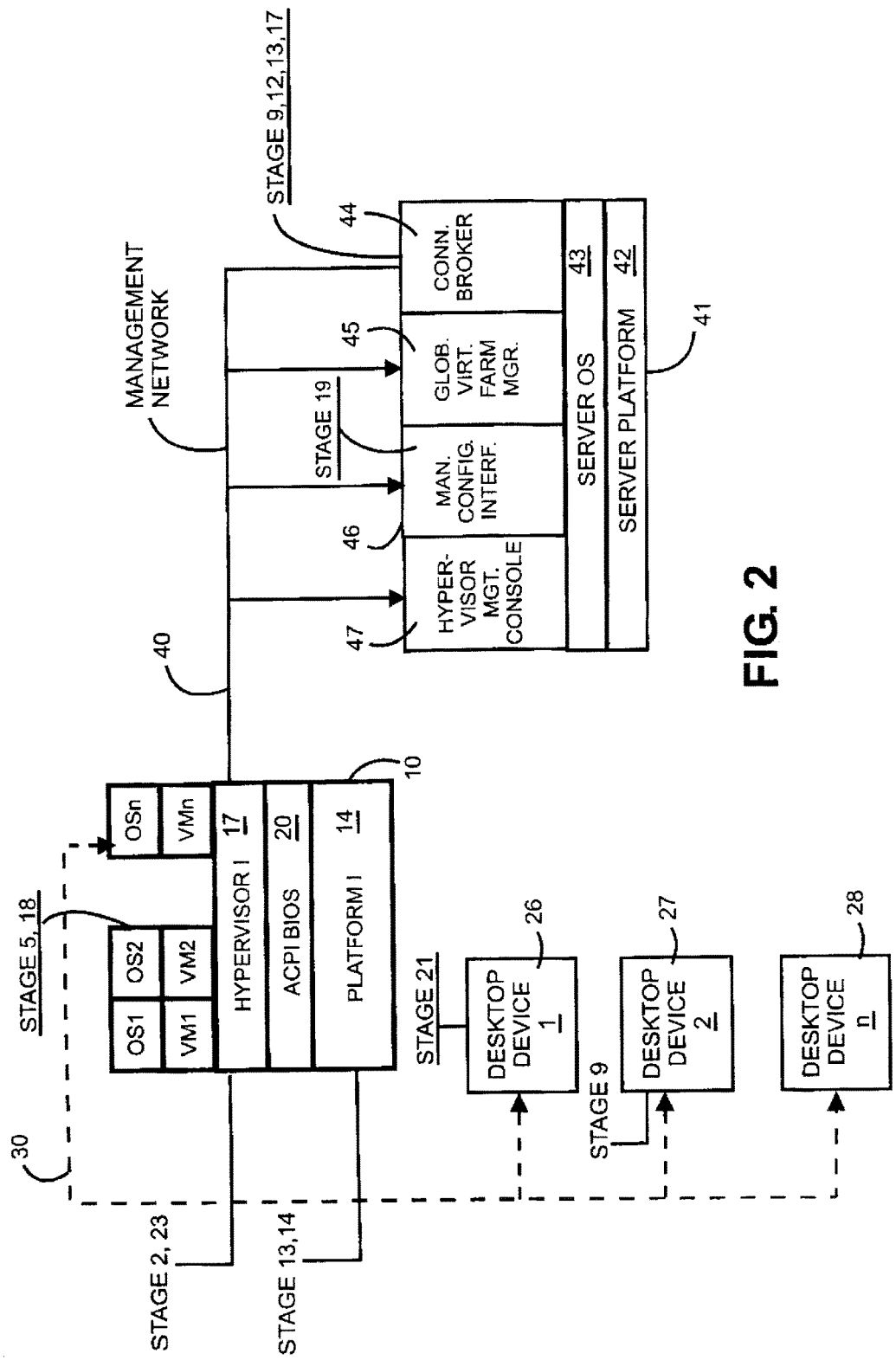
FIG. 2 is a diagrammatic view like that of FIG. 1, including a single representative virtual machine platform and a set of remote user computers or client devices connected to virtual machines in the platform to illustrate the non-active state monitoring of the user computers.
Figure 3:
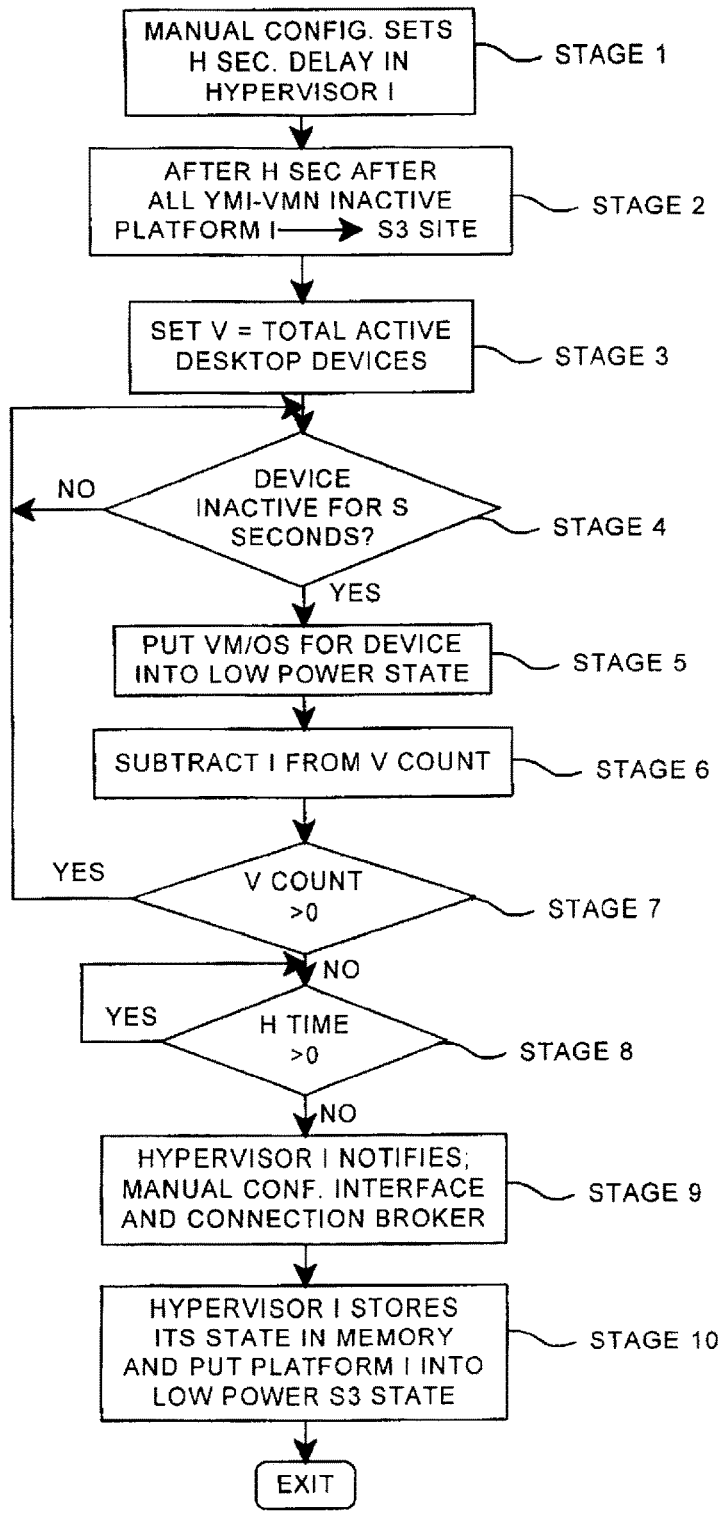
FIG. 3 is a general flowchart of a program set up to implement the present invention for power management in a virtual machine environment to illustrate the switching of a virtual machine platform to a reduced power state when all of the client devices connected to virtual machines controlled by the extended platform hypervisor are in a non-active state.
Figure 4:
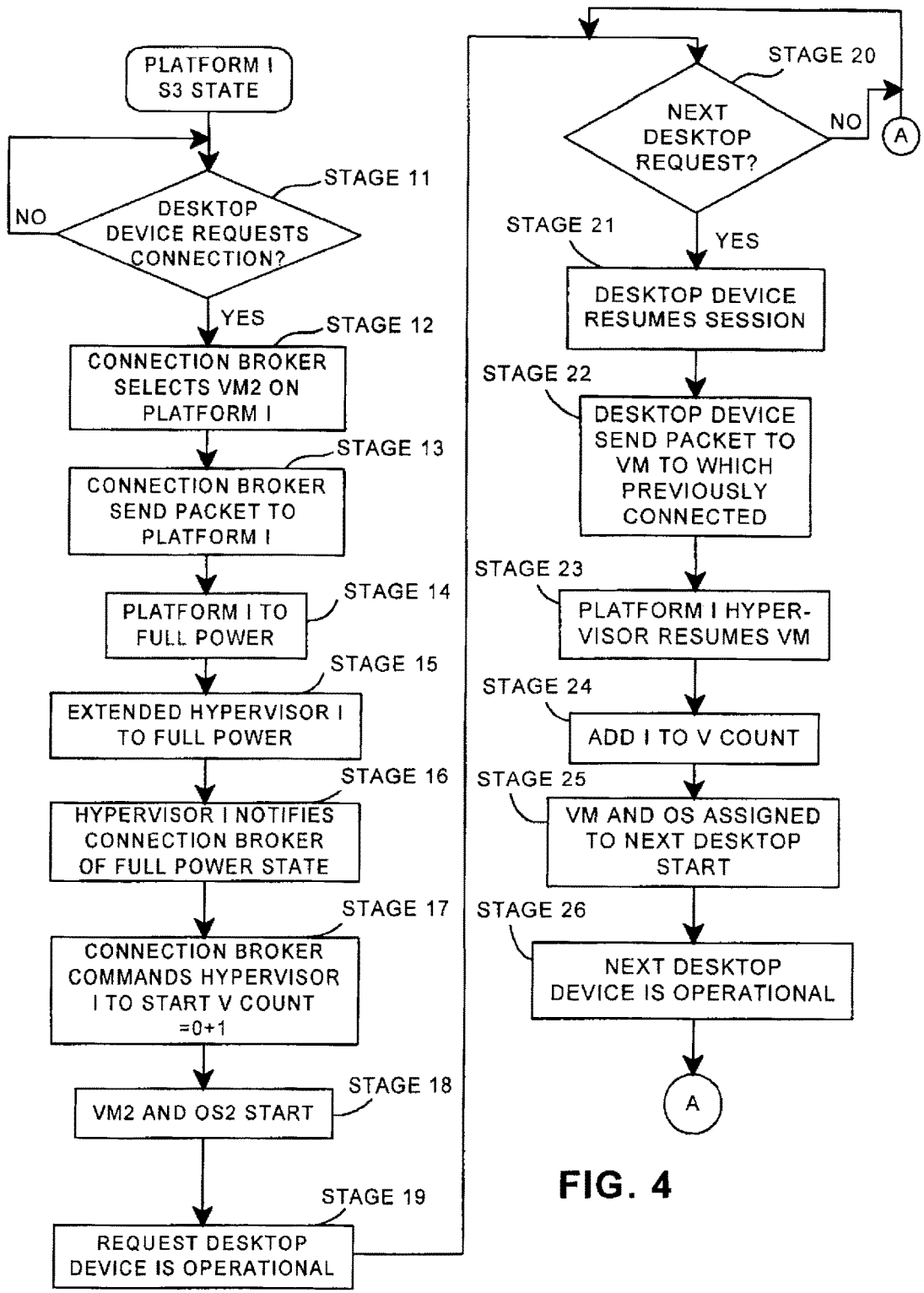
FIG. 4 is a general flowchart of a program set up to implement the present invention for power management in a virtual machine environment to illustrate the switching of a virtual machine platform to a full power state when one or more of the client devices connected to virtual machines controlled by the extended platform hypervisor resume an active state.

FIG. 2, which is a portion of the virtual farm of FIG. 1 that will be used in conjunction with the programs to be discussed with respect to FIGS. 3 and 4 to describe the power management implementation of the present invention for providing power management for a virtual machine farm in which each hypervisor respectively serving each virtual machine platform in the farm is provided with an extended hypervisor function, coacts with functions provided from the overall virtual machine farm management server for managing each respective virtual machine platform to maximize the time that each platform is in the reduced power state. For purposes of simplifying this illustration, we will describe the invention with respect to a single virtual machine unit 10 supported by platform I, 14, FIG. 2.

The running of the program of the present invention will now be described in the stages shown in FIG. 3, and these stages will be referenced, where applicable, in the illustrative portion of the virtual machine farm of FIG. 2.

Stage 1: using management configuration interface 46 of management server 41, the hypervisor 17 for a virtual machine platform 14 is configured so that after an H second delay subsequent to all VM1 through VMn being in the inactive state, hypervisor I, 17 will cause the farm unit 10 of platform 14 to go into the reduced power state S3 "sleep" state, Stage 2. The Stage 2 data is stored in hypervisor 17 that coacts with management configuration interface 46 in the management server 41 to function as an "extended hypervisor"; wherein hypervisor 17 begins monitoring of VM1 through VMn, and at Stage 3, a V_Count is set=total number of active devices 1-$n$ (26 through 28, FIG. 2). At Stage 4, a determination is made as to whether a device 1-$n$ has been inactive for a period S. If Yes then, Stage 5, the VM1 through n/OS1-$n$ for the respective device is put into the reduced power S3 state. This is carried out by ACPI BIOS 20, FIG. 2, which causes the VM supporting the inactive device, e.g. VM1 supporting device 26, to automatically suspend execution, and the hypervisor 17 has the state of VM1 stored in the standard manner, so as to be available whenever device 26 becomes active again.

The V_Count is decremented by 1 in hypervisor 17, Stage 6, and a determination is made in hypervisor 17 as to whether V_Count>0, Stage 7. If Yes, the process returns to Stage 4 and the virtual machine unit of platform 14 continues to run in the full power "S5" state. Subsequently, if all of devices 1 through n (26 through 28) become inactive and the determination from Stage 7 is No, then a further determination is made, Stage 8, as to whether the predetermined delay H>0. If No then, Stage 9, hypervisor 17 notifies the manual configuration interface 46 and connection broker 44 in management server 41. Hypervisor 17 stores its state so that it will be available when the supported devices become active and puts the platform 14 into the reduced power S3 state, Stage 10.

Now with respect to FIG. 4, there will be described the running of the program of the present invention to restore the virtual platform 14 in the farm 13, FIG. 2, to the full powered state upon the activation of one of the desktop devices 1 through n. At the entry point, FIG. 4, Platform I, 14 (FIG. 2), is at the reduced S3 power level and all of the devices 1 through n in set 23 are inactive. An initial determination is made, Stage 11, whether a device has become activated and requested a connection to a VM. If Yes then, Stage 12, connection broker (CB) 44, preferably a LeoStream connection broker in management server 41 determines that a VM, i.e. VM2 (still in S3 state), will be used on extended function hypervisor 17 serving platform 14, and the connection broker sends a wake-up packet to the MAC (Media Access Control) Address of the NIC (Network Interface Card) on Platform 14, Stage 13. Platform 14 then transitions extended hypervisor I (17) to the full power S5 state, Stage 15. Hypervisor I notifies CB 44 of its full power state, Stage 16, and in return CB 44 functions to command extended Hypervisor I to raise the V_Count to 0+1=1, Stage 17. OS2 and VM2 start up, Stage 18, and the activated desktop device, e.g. desktop 27 is operational, stage 19.

At this point, the awakened platform I (14) awaits the next activated desktop, a Yes decision stage 20, FIG. 4. In the description above, the requesting desktop device was a new user device. Now, for purposes of a thorough description, assume that the determination at 20 is Yes and that the next requesting desktop is a previous user desktop, e.g. desktop 1 (26) in set 23. The resumption of the session on desktop device 26 commences as indicated by any HID (Human Interface Device) movement, Stage 21. Device 26 sends a wake-up packet to the MAC (Media Access Control) Address of its previously connected VM1, Stage 22. Extended hypervisor 17 resumes the activation of VM1, Stage 23, and adds 1 to the V_Count, Stage 25. OS1 and VM1 start up, Stage 25, and the activated desktop device, e.g. desktop 26 is operational, Stage 26. At this point, the process is routed via branch "A" to Stage 20 and the processing is continued.

Although certain preferred embodiments have been shown and described, it will be understood that many changes and modifications may be made therein without departing from the scope and intent of the appended claims.

What is claimed is:

1. A method comprising:
setting a counter, by a hypervisor for a plurality of virtual machines (VMs) running on a computing device, equal to a number of a plurality of client computing devices that are actively using corresponding operating systems (OSs) of the VMs, wherein each VM corresponds to one of the client computing devices;
in response to determining that a client computing device is not actively using the corresponding OS, causing, by the hypervisor, the VM having the corresponding OS to enter in a low-power state without causing other VMs running on the computing device to enter the low-power state and without causing the computing device to enter the low-power state, and decrementing the counter; and
in response to the counter reaching zero, waiting for a predetermined length of time and then causing the computing device to enter the low-power state, by the hypervisor,
wherein the computing device enters the low-power state due to the hypervisor causing the computing device to enter the low-power state, and after all the VMs running on the computing device have already entered the low-power state.

2. The method of claim 1, further comprising:
in response to determining that a client computing device is now actively using the corresponding OS:
causing, by the hypervisor, the computing device to exit the low-power state;
causing, by the hypervisor, the VM having the corresponding OS to exit the low-power state without causing other VMs on the computing device to exit the low-power state; and
incrementing, by the hypervisor, the counter.

3. The method of claim 1, further comprising:
in response to determining that a client computing device is now actively using the corresponding OS:
in response to the counter being equal to zero, causing, by the hypervisor, the computing device to exit the low-power state;
causing, by the hypervisor, the VM having the corresponding OS to exit the low-power state without affecting other VMs on the computing device;
incrementing, by the hypervisor, the counter.

4. The method of claim 1, further comprising:
monitoring, by the hypervisor, the VMs to determine whether the client computing devices are actively using the VMs.

5. The method of claim 1, wherein each VM is actively used by at most one of the client computing devices.

6. A non-transitory computer-readable data storage medium storing computer-executable code executable by a hypervisor to a perform a method comprising:
setting a counter equal to a number of a plurality of client computing devices that are actively using corresponding operating systems (OSs) of a plurality of virtual machines (VMs) managed by the hypervisor, wherein each VM corresponds to one of the client computing devices;
in response to determining that a client computing device is not actively using the corresponding OS, causing the VM having the corresponding OS to enter in a low-power state without causing other VMs running on the computing device to enter the low-power state and without causing the computing device to enter the low-power state, and decrementing the counter; and
in response to the counter reaching zero, waiting for a predetermined length of time and then causing, by the hypervisor, the computing device to enter the low-power state,
wherein the computing device enters the low-power state due to the hypervisor causing the computing device to enter the low-power state, and after all the VMs running on the computing device have already entered the low-power state.

7. The non-transitory computer-readable data storage medium of claim 6, wherein the method further comprises:
in response to determining that a client computing device is now actively using the corresponding OS:
causing the computing device to exit the low-power state;
causing the VM having the corresponding OS to exit the low-power state without causing other VMs on the computing device to exit the low-power state; and
incrementing the counter.

8. The non-transitory computer-readable data storage medium of claim 6, wherein the method further comprises:
in response to determining that a client computing device is now actively using the corresponding OS:
in response to the counter being equal to zero, causing the computing device to exit the low-power state;
causing the VM having the corresponding OS to exit the low-power state without affecting other VMs on the computing device;
incrementing the counter.

9. The non-transitory computer-readable data storage medium of claim 6, wherein the method further comprises:
monitoring the VMs to determine whether the client computing devices are actively using the VMs.

10. The non-transitory computer-readable data storage medium of claim 6, wherein each VM is actively used by at most one of the client computing devices.

11. A system comprising:
a computing device having a plurality of virtual machines (VMs); and
a hypervisor running on the computing device to:
set a counter equal to a number of a plurality of client computing devices that are actively using corresponding operating systems (OSs) of the VMs, wherein each VM corresponds to one of the client computing devices;

in response to determining that a client computing device is not actively using the corresponding OS, cause the VM having the corresponding OS to enter in a low-power state without causing other VMs running on the computing device to enter the low-power state and without causing the computing device to enter the low-power state, and decrementing the counter; and in response to the counter reaching zero, wait for a predetermined length of time and then cause, by the hypervisor, the computing device to enter the low-power state, wherein the computing device enters the low-power state due to the hypervisor causing the computing device to enter the low-power state, and after all the VMs running on the computing device have already entered the low-power state.

12. The system of claim 11, wherein the hypervisor is further to:

in response to determining that a client computing device is now actively using the corresponding OS:
cause the computing device to exit the low-power state;
cause the VM having the corresponding OS to exit the low-power state without causing other VMs on the computing device to exit the low-power state; and
increment the counter.

13. The system of claim 11, wherein the hypervisor is further to:

in response to determining that a client computing device is now actively using the corresponding OS:
in response to the counter being equal to zero, cause the computing device to exit the low-power state;
cause the VM having the corresponding OS to exit the low-power state without affecting other VMs on the computing device;
increment the counter.

14. The system of claim 11, wherein the hypervisor is further to:

monitor the VMs to determine whether the client computing devices are actively using the VMs.

15. The system of claim 11, wherein each VM is actively used by at most one of the client computing devices.

* * * * *